(12) United States Patent
Nakagawa

(10) Patent No.: US 8,873,090 B2
(45) Date of Patent: Oct. 28, 2014

(54) PRINT SYSTEM FOR OUTPUTTING DATA FROM WEB APPLICATION ON A NETWORK

(75) Inventor: Masashi Nakagawa, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 502 days.

(21) Appl. No.: 13/201,735

(22) PCT Filed: Apr. 15, 2011

(86) PCT No.: PCT/JP2011/002226
§ 371 (c)(1),
(2), (4) Date: Aug. 16, 2011

(87) PCT Pub. No.: WO2011/135792
PCT Pub. Date: Nov. 3, 2011

(65) Prior Publication Data
US 2012/0026548 A1 Feb. 2, 2012

(30) Foreign Application Priority Data
Apr. 28, 2010 (JP) ................................. 2010-104297

(51) Int. Cl.
*G06F 3/12* (2006.01)
(52) U.S. Cl.
CPC ............ *G06F 3/1203* (2013.01); *G06F 3/1287* (2013.01); *G06F 3/1228* (2013.01)
USPC ......................................... 358/1.15; 358/1.13
(58) Field of Classification Search
CPC ............................. G06F 3/1228; G06F 3/1287
USPC ................................................ 358/1.13, 1.15
See application file for complete search history.

(56) References Cited

U.S. PATENT DOCUMENTS

| | | | |
|---|---|---|---|
| 6,308,205 B1 * | 10/2001 | Carcerano et al. ............ 709/221 |
| 7,052,190 B2 * | 5/2006 | Ishii ................................ 400/62 |
| 7,196,803 B1 * | 3/2007 | Simpson et al. ............. 358/1.13 |
| 2002/0120742 A1 * | 8/2002 | Cherry ......................... 709/226 |
| 2003/0002077 A1 * | 1/2003 | Shima ......................... 358/1.15 |
| 2003/0053128 A1 * | 3/2003 | Oyama ........................ 358/1.15 |
| 2003/0090707 A1 * | 5/2003 | Simpson et al. ............. 358/1.15 |
| 2003/0169444 A1 * | 9/2003 | Kemp et al. .................. 358/1.15 |
| 2004/0100651 A1 * | 5/2004 | Leone et al. ................. 358/1.15 |
| 2004/0130744 A1 | 7/2004 | Wu |
| 2004/0184080 A1 * | 9/2004 | Gotoh et al. ................. 358/1.15 |
| 2004/0196491 A1 * | 10/2004 | Uchino ....................... 358/1.15 |
| 2007/0211296 A1 * | 9/2007 | Toda ........................... 358/1.18 |
| 2007/0291302 A1 * | 12/2007 | Trappe et al. ................ 358/1.15 |

(Continued)

FOREIGN PATENT DOCUMENTS

EP 1465052 A2 10/2004
EP 1973031 A1 9/2008

(Continued)

*Primary Examiner* — Benny Q Tieu
*Assistant Examiner* — Quyen V Ngo
(74) *Attorney, Agent, or Firm* — Canon U.S.A., Inc. IP Division

(57) ABSTRACT

A print system according to the present invention includes an information processing apparatus including a Web browser, an application server including a Web application to be used via the Web browser, and a printer. The print system includes a transmission unit that, if the Web browser included in the information processing apparatus receives print data generated by the Web application and receives a print execution instruction, transmits the print data to the printer.

31 Claims, 14 Drawing Sheets

(56) References Cited

U.S. PATENT DOCUMENTS

| | | | |
|---|---|---|---|
| 2009/0168100 A1* | 7/2009 | Huster | 358/1.15 |
| 2009/0303547 A1* | 12/2009 | Kurihara | 358/3.28 |
| 2010/0122181 A1* | 5/2010 | Kawai | 715/744 |
| 2010/0171977 A1* | 7/2010 | Fu | 358/1.15 |
| 2010/0195143 A1* | 8/2010 | Kanemitsu | 358/1.15 |
| 2012/0140285 A1* | 6/2012 | Kamath et al. | 358/1.15 |

FOREIGN PATENT DOCUMENTS

| | | |
|---|---|---|
| JP | 2000066984 A | 3/2000 |
| JP | 2003-216366 A | 7/2003 |
| JP | 2003216367 A | 7/2003 |

* cited by examiner

Fig. 8

```xml
<?xml version="1.0" encoding="UTF-8" ?>
<psf:PrintTicket
xmlns:psf="http://schemas.microsoft.com/windows/2003/08/printi
ng/printschemaframework"
xmlns:xsi="http://www.w3.org/2001/XMLSchema-instance"
xmlns:xsd="http://www.w3.org/2001/XMLSchema" version="1"
xmlns:psk="http://schemas.microsoft.com/windows/2003/08/printi
ng/printschemakeywords">
  <psf:Feature name="psk:PageMediaSize">
   <psf:Option name="psk:NorthAmericaLetter">
    <psf:ScoredProperty name="psk:MediaSizeWidth">
     <psf:Value xsi:type="xsd:integer">215900</psf:Value>
    </psf:ScoredProperty>
    <psf:ScoredProperty name="psk:MediaSizeHeight">
     <psf:Value xsi:type="xsd:integer">279400</psf:Value>
    </psf:ScoredProperty>
   </psf:Option>
  </psf:Feature>
  <psf:Feature name="psk:PageOrientation">
   <psf:Option name="psk:Landscape" />
  </psf:Feature>
  <psf:ParameterInit name="psk:JobCopiesAllDocuments">
   <psf:Value xsi:type="xsd:integer">2</psf:Value>
  </psf:ParameterInit>
</psf:PrintTicket>
                    .
                    .
                    .
                    .
                    .
```

Fig. 9

```
<?xml version="1.0" encoding="UTF-8" ?>
<psf:PrintCapbilities
xmlns:psf="http://schemas.microsoft.com/windows/2003/08/printi
ng/printschemaframework"
xmlns:xsi="http://www.w3.org/2001/XMLSchema-instance"
xmlns:xsd="http://www.w3.org/2001/XMLSchema" version="1"
xmlns:psk="http://schemas.microsoft.com/windows/2003/08/printi
ng/printschemakeywords">
<Body>
  <psf:Device>
    <psf:PrinterName>XXXXX xxxxx</psf:PrinterName>
    <psf:IsPDFSupported>false</psf: IsPDFSupported>
    <psf:IsXPSSupported>true</psf: IsXPSSupported>
                        .
                        .
                        .
                        .
                        .
```

PRINT SYSTEM FOR OUTPUTTING DATA FROM WEB APPLICATION ON A NETWORK

TECHNICAL FIELD

The present invention relates to a Web application print system, and more specifically to a technique for easily printing a document created by an application that operates on a Web browser.

BACKGROUND ART

In recent years, Web applications operating on a Web browser have being actively studied and developed. The Web application is an application that can be used over a network via the Web browser without installing a program into an information processing apparatus. The Web application has been developed along with a spread of a "cloud computing technique" for providing via the network an information technology (IT) service that has been provided by being incorporated into each client personal computer (PC) to be provided. Some Web applications can provide functions for creating documents and calculating tables.

A method for printing document data edited by the conventional Web application will be described. When a user inputs a print instruction, a Web application converts a document to be processed by the Web application into a portable document format (PDF) data, and transfers the converted data via the network to a client who has activated the Web browser. The Web browser on the information processing apparatus notifies the user of reception of the document data in the PDF format. Subsequently, the user can print the document data in the PDF format using the application in the client. More specifically, when the user gives a print instruction again using the application for processing this PDF data, an image drawing instruction is transmitted to a printer driver in the client. The printer driver converts the image drawing instruction into a page description language (PDL) format that can be interpreted by the printer, and then transmits the PDL data to the printer on the network as a print job.

As described above, to print the document created by the conventional Web application, the user needs to previously install the PDF program or the printer driver into the client.

Further, Japanese Patent Application Laid-Open No. 2003-216366 discusses a technique in which a plug-in program of the Web browser acquires data to be printed and print setting data from an application server, and then performs printing using the printer driver that has been previously installed in the client.

CITATION LIST

Patent Literature

[PTL 1] Japanese Patent Application Laid-Open No. 2003-216366

SUMMARY OF INVENTION

Technical Problem

However, for a user who wants to mainly use the Web application, an environment is preferable for the client in which only minimum functions other than the Web browser operate. Therefore, in addition to the Web browser, to individually install the application does not necessarily satisfy the user's demands. Further, to install the printer driver may be a troublesome work for the user.

Furthermore, in the print system discussed in Japanese Patent Application Laid-Open No. 2003-216366, a function for transmitting the print setting data to the client needs to be added for the Web application program side. Since the conventional general Web application program does not have such a function, the technique described in Japanese Patent Application Laid-Open No. 2003-216366 cannot be instantly used.

Solution to Problem

The present invention is related to a method for transmitting data received from the Web application to a printer without involving a printer driver to realize printing.

According to an aspect of the present invention, a print system that includes an information processing apparatus including a Web browser and an application server including an application used via the Web browser, wherein the application server includes a generation unit configured to generate print data to be transmitted to the information processing apparatus using the application according to a print instruction via the Web browser, and the information processing apparatus includes a control unit configured, as a function of the Web browser, to control a display of a screen for receiving an execution instruction to print the print data generated by the application server, and a transmission unit configured, as a function of the Web browser, to transmit the print data received from the application server to the printer if the execution instruction for printing is received via the screen displayed by the control unit.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 8 is an example of print setting data.

FIG. 9 is an example of device information about a printer.

DESCRIPTION OF EMBODIMENTS

Various exemplary embodiments, features, and aspects of the invention will be described in detail below with reference to the drawings.

Figure 1:
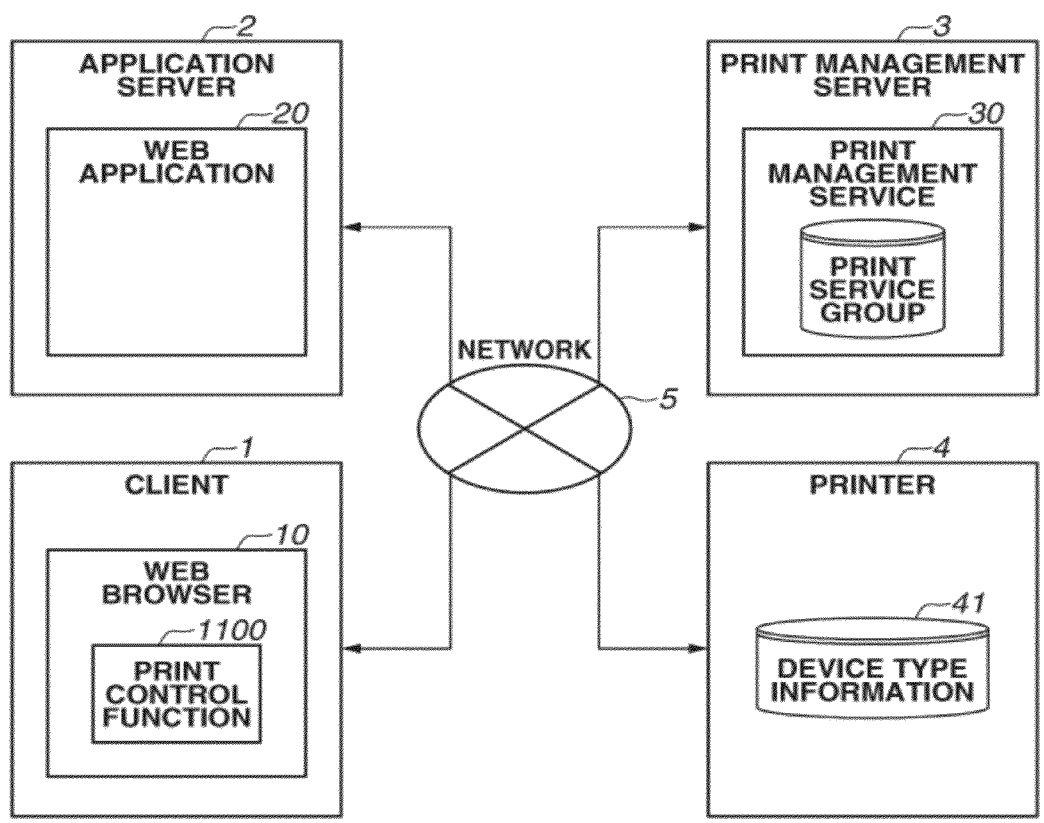
FIG. 1 is an example of a configuration of a print system according to the present invention.

FIG. 1 is an example of a configuration illustrating a print system for printing Web contents according to a first exemplary embodiment of the present invention.

A client 1 that is an information processing apparatus directly operated by a user is connected to a network 5 via a network interface such as an Ethernet (registered trademark). A plurality of clients may be connected to the network 5. A Web browser 10 is an application for browsing Web contents installed in the client 1. The Web browser 10 is previously provided with a print control function 1100 that can acquire and perform an appropriate print service according to a print instruction by the user via the Web browser 10.

An application server 2 is connected to the network 5. A Web application 20 is a program that operates on an operating system of the application server 2. The user accesses the application server 2 connected to the network 5 via the Web browser 10 to use the Web application 20. For the client 1, the application server 2 may serve as a remote server connected to the network on the internet.

A print management server 3 is also connected to the network 5. A print management service 30 is a program that operates on the operating system of the print management server 3. A print service database stores a print service group that is acquired, performed, and controlled by the print control function 1100 of the Web browser 10.

A printer 4 is connected to the network 5. A plurality of printers may be connected to the network 5. Further, the printer may be directly connected to the client without the network 5 using a predetermined communication line such as a universal serial bus (USB).

From a point of view of the user, since, when the user uses the print function according to the exemplary embodiment of the present invention while using the Web application 20, the print function seems a part of the function provided by the Web application 20, thus the user is not conscious about the print management service 30.

Figure 2:
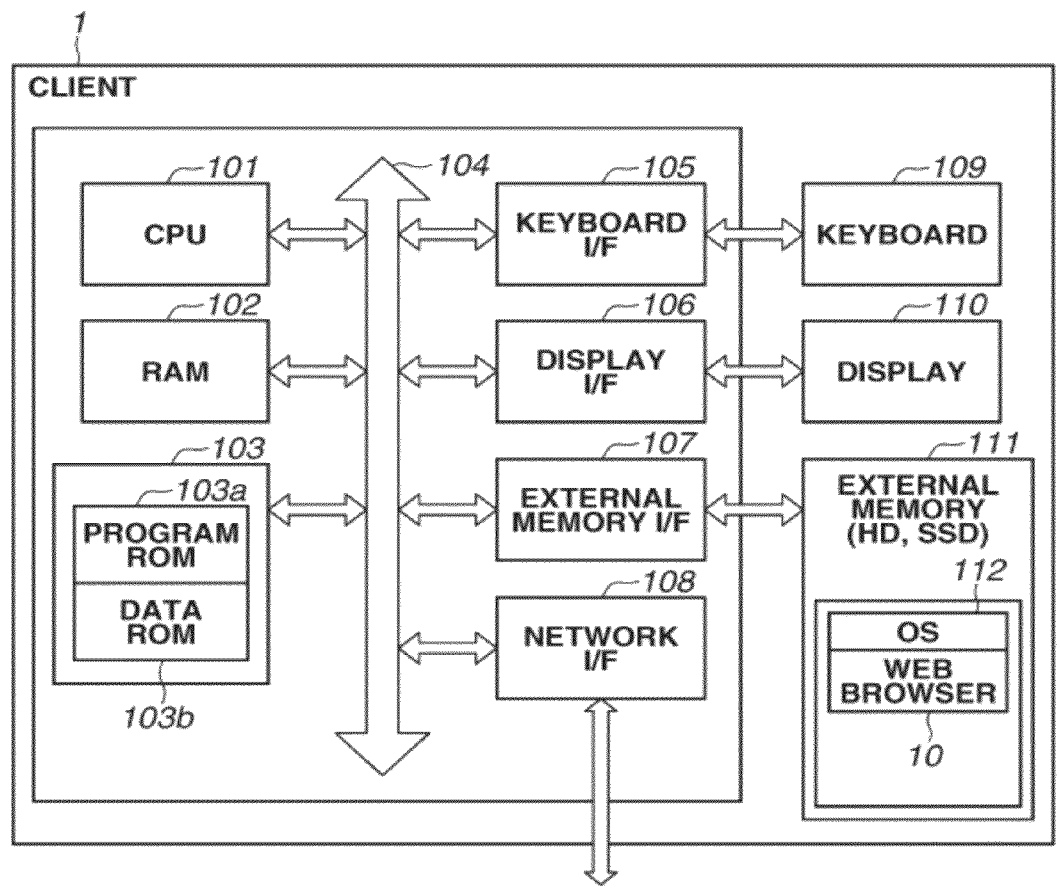
FIG. 2 is an example of a hardware configuration of an information processing apparatus that can be applied for the present invention.

FIG. 2 is a block diagram illustrating an example of a hardware configuration in the client 1 which is a general information processing apparatus.

In the client 1, a central processing unit (CPU) 101 comprehensively controls each device connected to a system bus 104 according to the program stored in a random access memory (RAM) 102. The RAM 102 also functions as a main memory and a work area of the CPU 101. A read only memory (ROM) 103 includes a program ROM 103a that stores a boot program and a basic input output system (BIOS), and a data ROM 103b that stores various pieces of data. A keyboard controller interface (I/F) 105 controls a key input from a keyboard 109 and a pointing device (i.e. a mouse) (not illustrated). A display I/F 106 controls a display on a display 110.

An external memory I/F 107 controls access to an external memory 111 such as a hard disk (HD) and a solid state disk (SSD). The external memory 111 functions as a storage medium that can be read by the information processing apparatus and stores applications such as an operating system (hereinafter, referred to as "OS") 112 and the Web browser 10. The external memory 111 can further store a user file and an edited file (not illustrated). A network I/F 108 is connected to the network 5 to perform communication control processing.

The application server 2 and the print management server 3 included in the print system according to the exemplary embodiment of the present invention serve as a server, and have an apparatus configuration similar to that of the client 1. However, the programs operating on the client 1, the application server 2, and the print management server 3 are different from one another which is described with reference to FIG. 1.

Figure 3:
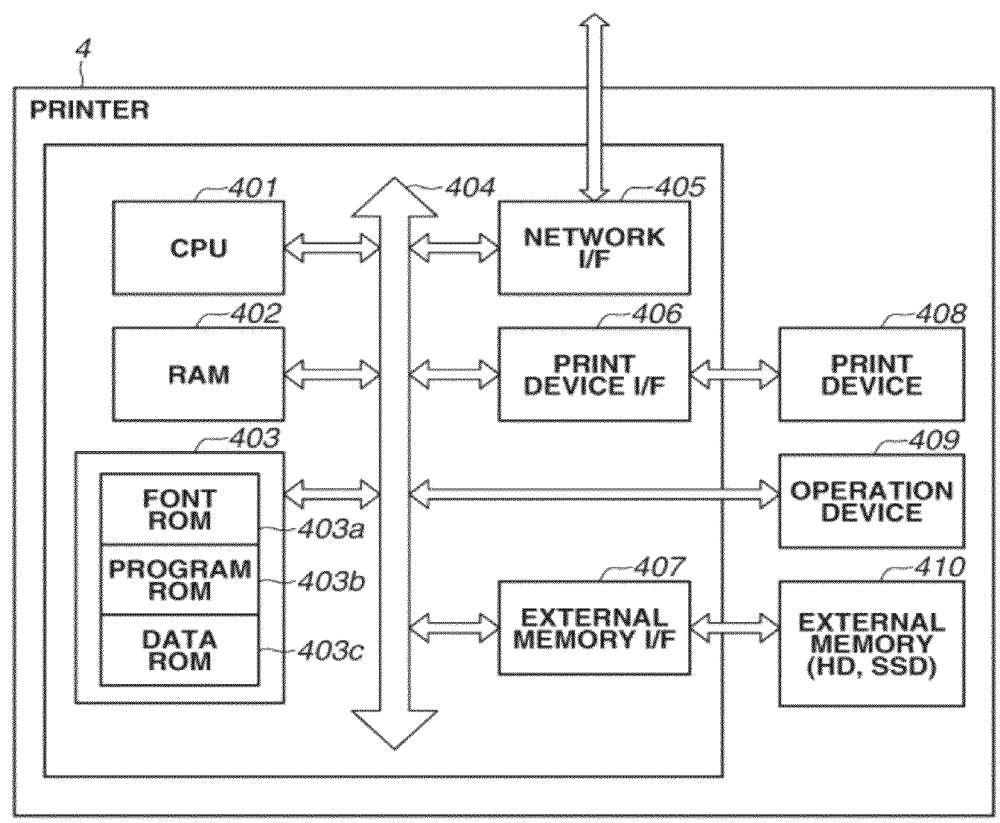
FIG. 3 is an example of a hardware configuration of a printer that can be applied to the present invention.

FIG. 3 is a block diagram illustrating an example of a hardware configuration in the printer 4.

A CPU 401 controls an entire operation of the printer 4. A RAM 402 functions as a main memory and a work area of the CPU 401 and also is used as an output information extension region and an environmental data storage region. The RAM 402 also includes a non-volatile RAM (NVRAM) region and thus can increase a memory capacity with an option RAM to be connected to an extension port (not illustrated).

A ROM 403 includes a font ROM 403a that stores various types of fonts, a program ROM 403b that stores a control program executed by the CPU 401, and a data ROM 403c that stores various pieces of data. A network I/F 405 is connected to the network 5 to perform the communication control processing. A print device I/F 406 controls an interface connecting with a print device 408 which is a printer engine. Access to an external memory 410 is controlled by an external memory I/F 407. Further, the external memory 410 includes the HD to be connected as an option, and stores font data, an emulation program, and form data.

An operation device 409 includes an operation panel for receiving an operation by a user. The operation panel includes a switch and a light emitting diode (LED) display device for operations (not illustrated). The CPU 401 outputs an image signal as output information to the print device 408 via the print device I/F 406 based on a control program stored in the program ROM 403b in the ROM 403.

Figure 4:
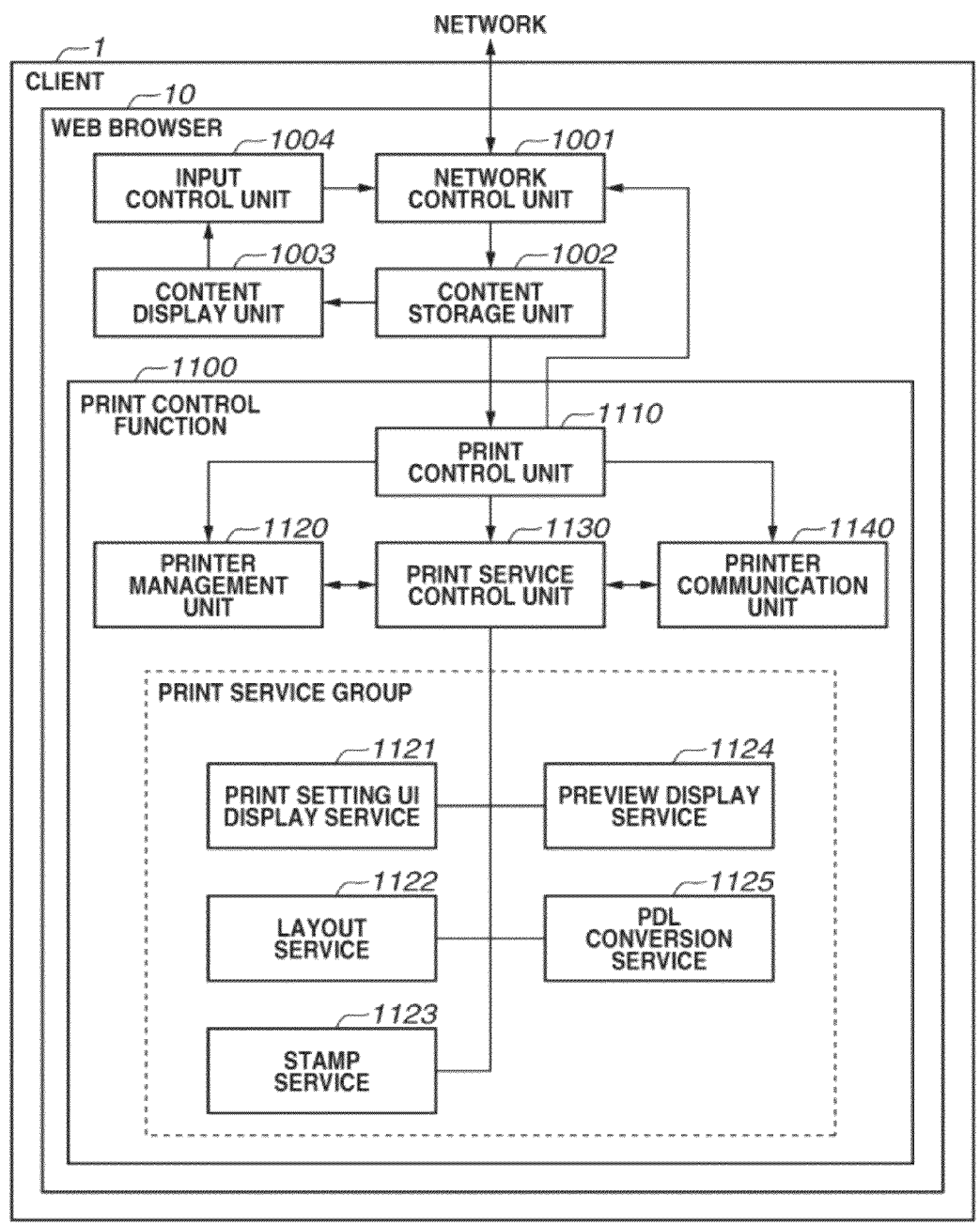
FIG. 4 is an example of an internal configuration of a Web browser.

FIG. 4 is a block diagram illustrating an example of internal components of the Web browser 10. The Web browser 10 operates as an application on the OS of the client 1.

A network control unit 1001 controls communication with the network 5 and performs processing for receiving the Web contents and processing for transmitting data input by the user. A content storage unit 1002 stores the Web contents acquired by the network control unit 1001 in the RAM 102 or the external memory 111, and takes out the Web contents in response to a request from another component.

A content display unit 1003 takes out the Web contents stored by the content storage unit 1002, interprets descriptions of a document in a markup language format such as hyper text markup language (HTML), a style sheet language and image data, and then performs processing for displaying the Web contents on the display 110. Further, the content display unit 1003 applies and displays a style sheet when it is specified by the Web contents.

An input control unit 1004 detects an input to a link or a button displayed on the display 110 as a menu command of the Web browser 10 and a part of the Web contents and then performs the processing according to the input. For example, when the user places a mouse cursor over the link with an underlined character string in the displayed Web contents, the input control unit 1004 instructs the content display unit 1003 to display the character string of the link in a highlighted color. Further, when the user clicks a link, the input control unit 1004 instructs the network control unit 1001 to acquire other Web contents indicated by the link.

The print system according to the exemplary embodiment of the present invention includes the print control function 1100 that controls the print processing as the function of the Web browser 10. The print control function 1100 performs control for transmitting the print data to the printer 4 and processing for acquiring the print service from the print management server 3 according to the print instruction by the user. According to the present exemplary embodiment, the print control function 1100 includes a print control unit 1110, a printer management unit 1120, a print service control unit 1130, and a printer communication unit 1140.

The print control unit 1110 processes a request transmitted from the network control unit 1001 and gives an instruction for processing to another component. Further, the print control unit 1110 acquires print data 208 from the Web application 20 in conjunction with the content storage unit 1002. Furthermore, the print control unit 1110 controls display of a management screen 610 that receives a print execution instruction from the user which is described below.

The printer management unit 1120 is a component that manages an output target printer such as the printer 4. A printer that can be the output target is registered to a predetermined storage region in the client based on an instruction by the user in advance so that the Web browser 10 can handle the printer. Further, the printer management unit 1120 may have a function for searching the printer that can be the output target of the print data via the network control unit 1001 of the Web browser 10. The printer that can be the output target is displayed on the management screen 610.

The printer communication unit 1140 communicates with the printer 4 using the network control unit 1001 of the Web browser 10 and controls the transmission of the print data. Further, when the print service is executed as described below, the printer communication unit 1140 performs control for acquiring device type information 41 about the printer 4.

The print service control unit 1130 performs mainly processing described below. When the print data 208 acquired from the Web application 20 is transmitted to the printer 4 selected as the output target printer, the print service control unit 1130 performs processing for providing a screen in which the user can check whether to transmit the print data 208 with a predetermined print setting. At this point, for example, by acquiring the device type information from the output target printer, the print service control unit 1130 can create and display a print setting screen 620 for allowing the user to change an output format of the print data such as layout setting as described below.

Further, the print service control unit 1130 acquires from the print management service 30 and performs the service program for providing various types of print services according to the print data 208, the print setting data set therefore, and the device type information 41. The service programs acquired by the print service control unit 1130 from the print management server 3 as necessary will be described below. In the present exemplary embodiment, specific five examples will be described as the print services.

A print setting UI display service 1121 creates a user interface (UI) for performing print setting on the print data and displays the UI on the Web browser 10. An example of a UI screen will be described with reference to FIGS. 6A to 6C. When the user sets each setting item, the set values are stored as the print setting data. For example, the print setting data is setting information necessary for printing. In Windows (registered trademark) OS, the DEVMODE structure and Print- Ticket correspond to the setting information. As an example of the print setting data, details will be described with reference to FIG. 8.

For example, in a case where a plurality of pages are integrated into one surface of a sheet with respect to the print data, a layout service 1122 is used to perform printing in a specific output format. More specifically, the layout service 1122 is used when a set value for "PAGE INTEGRATION" in the print setting data is 2-up or more.

A stamp service 1123 is used when the print data is printed with a stamp image overlapped thereon. More specifically, the stamp service 1123 is used when a set value for "STAMP" of the print setting data is "ON".

A preview display service 1124 is used when print preview is displayed before printing is performed. More specifically, the preview display service 1124 is used when a set value for "PRINT PREVIEW" of the print setting data is "ON".

A page description language (PDL) conversion service 1125 is used when the print data acquired from the Web application 20 is converted into a print language that can be interpreted by the printer. More specifically, the PDL conversion service 1125 determines whether the printer supports a data format of the print data 208, and converts the print data into the PDL supported by the printer as necessary.

According to the exemplary embodiment of the present invention, the print control function 1100 included in the Web browser 10 may have only functions of a part of the components illustrated in FIG. 4. More specifically, the print control function 1100 may have a simple configuration in which at least any of functions for searching the printer on the network, acquiring the device type information from the printer, and acquiring the service program from the print management server 3 is not included.

Even the Web browser 10 having the simple configuration described above, the Web browser 10 can allow the user to check the standard print setting (e.g., setting the number of copies to print) for the selected printer and to realize printing of the print data acquired from the Web application 20. Instead of acquiring the above-described service programs as necessary, the print service control unit 1130 may be previously provided with the preview display service 1124 and the PDL conversion service 1125 as a service, for example.

The print control function 1100 that has been described so far can be provided as a plug-in program of the Web browser 10. With this arrangement, a vendor of the printer can flexibly provide the Web browser 10 that has already operated in the information processing apparatus with the plug-in program for providing the service for performing optimum printing.

Figure 5:
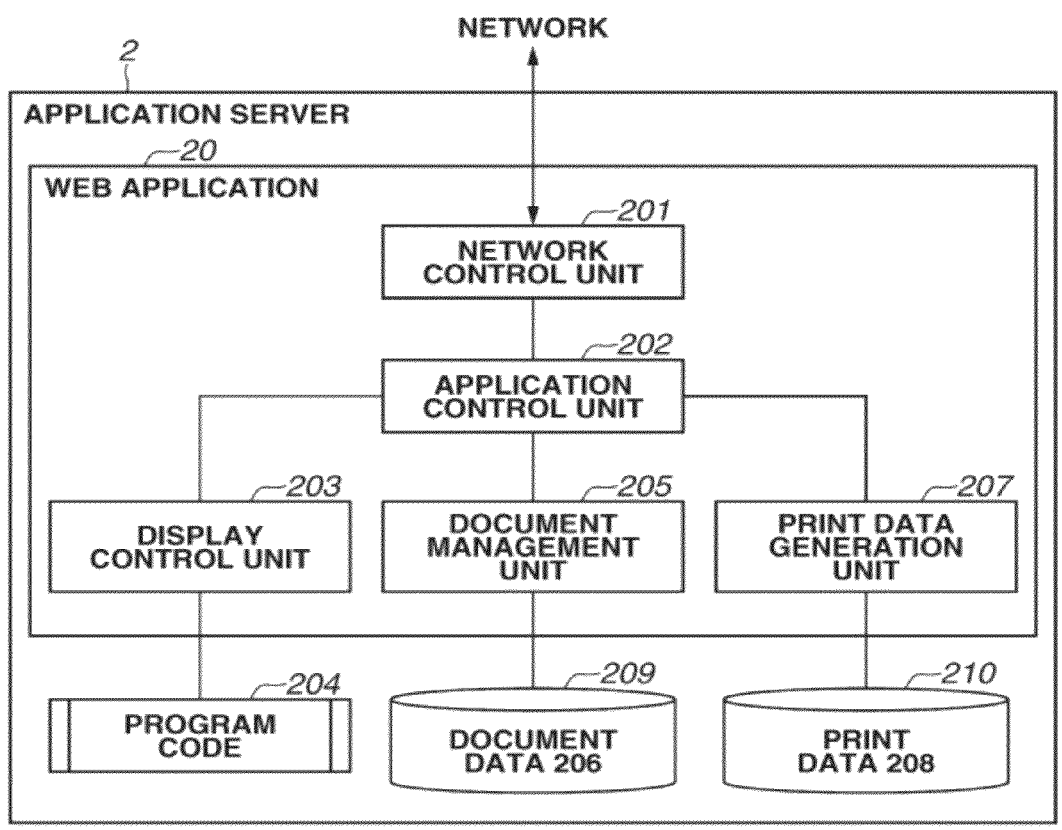
FIG. 5 is an example of an internal configuration of a Web application.

FIG. 5 is a block diagram illustrating an example of internal components of the application server 2.

A network control unit 201 receives a request (instructions to activate, operate, and end the Web application) from the Web browser 10 and transmits the request to an application control unit 202. Further, the network control unit 201 performs control for transmitting a response from the application control unit 202 to the Web browser 10. The application control unit 202 processes the request transmitted from the network control unit 201 and gives an instruction for processing to another component.

A display control unit 203 reads a stored program code 204, creates the Web contents corresponding to the user interface displayed on the Web browser, and transmits the created Web contents to the application control unit 202. Further, the display control unit 203 processes a request for operating input transmitted from the application control unit and creates data for displaying the UI according to the input.

A document management unit 205 performs control for storing document data 206 created or edited by the user in an external memory 209 of the Web application 20 and reading the document data therefrom. While the conventional embedded type application stores the document data in the client of the user, the Web application is characterized in that the document data is stored on the server.

A print data generation unit 207 converts the document data 206 into print data 208 in a format appropriate for printing according to a request of the print instruction from the Web browser 10. A predetermined memory 210 is used to convert the data. The format appropriate for printing may include the extensible markup language (XML) and the portable document format (PDF). The print data generated here is transmitted to the Web browser 10.

Figure 6A:
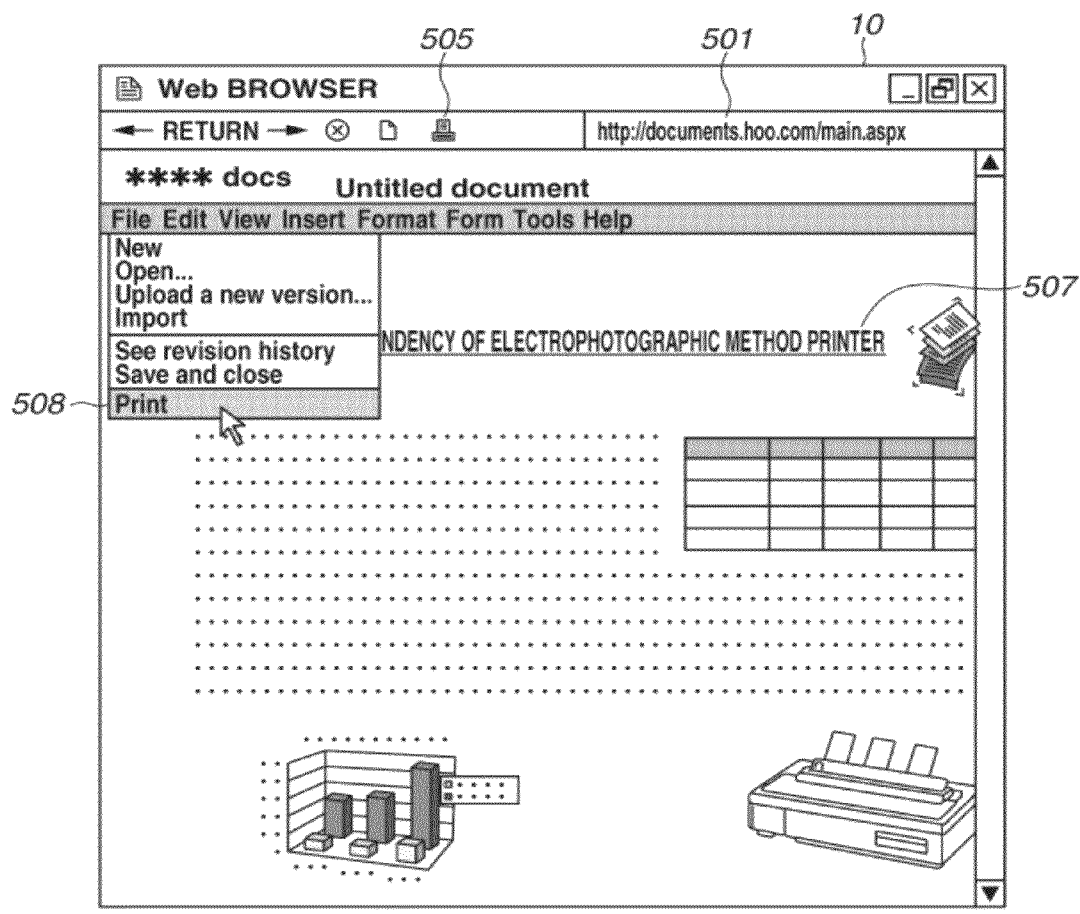
FIG. 6A is an example of an interface (I/F) of a Web application displayed via a Web browser.
Figure 6B:
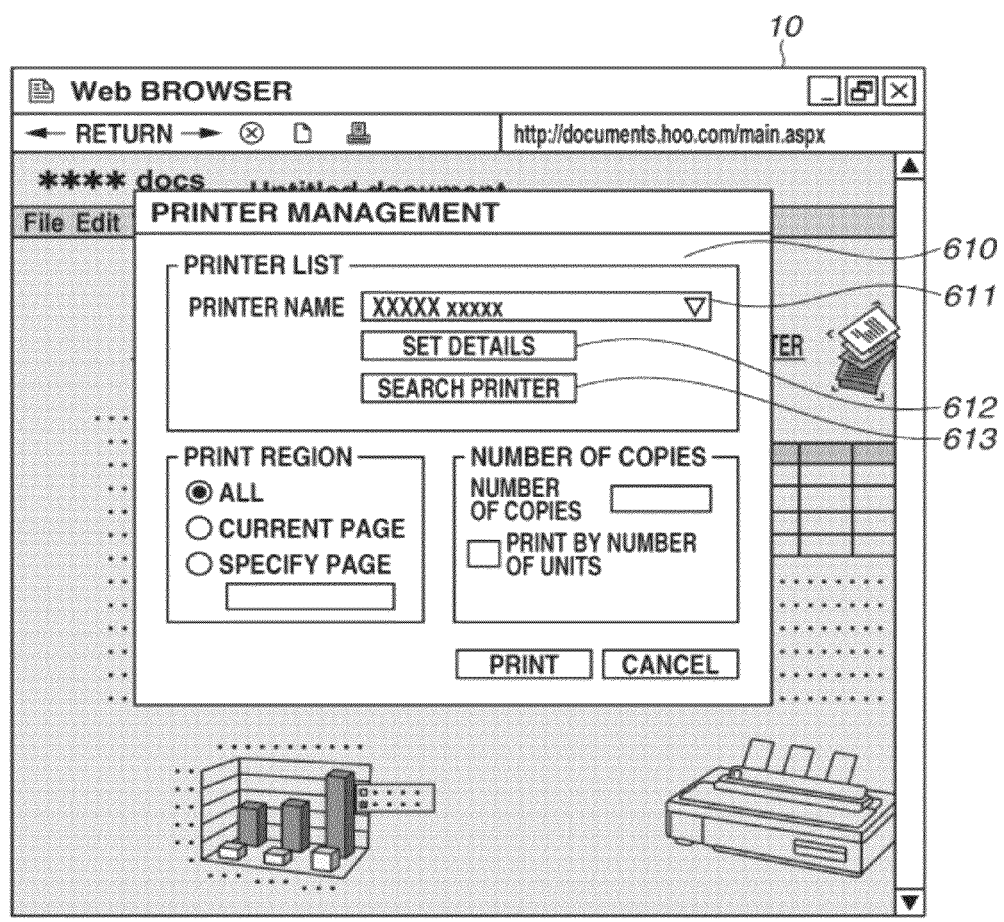
FIG. 6B is an example of an interface (I/F) of the Web application displayed via the Web browser.
Figure 6C:
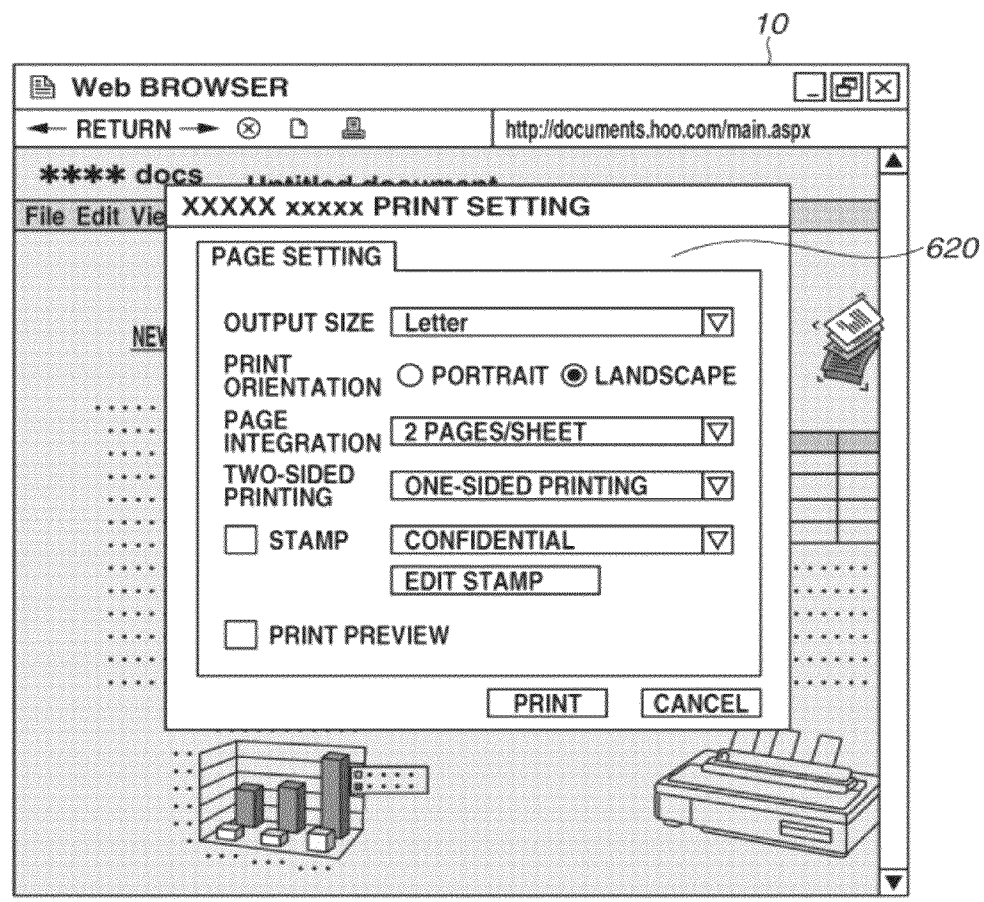
FIG. 6C is an example of an interface (I/F) of the Web application displayed via the Web browser.

FIGS. 6A to 6C are examples of displaying the UIs provided by the Web application 20 that is activated on the Web browser 10 via the network 5.

First, with reference to FIG. 6A, a display for giving the printing instruction with respect to print document data which is displayed to be edited using the Web application 20 will be described.

A uniform resource locator (URL) box 501 is included in the Web browser 10. The Web browser 10 receives input of URL information described in a URL box 501 as the Web contents on the network 5 and transmits a request for activating the Web application 20 to the application server 2. In response to the activation request, the Web application 20 transmits to the Web browser 10 the information for displaying the UI created by the display control unit 203.

The Web browser 10 receives the information for displaying the UI as the Web contents, and displays the information on a display region 507 of the Web contents. At this point, it is desirable that the UI displayed in the display region 507 is designed not to a similar appearance of a normal Web page but to a screen of a general document creating application.

In the Web browser 10, the user can use two types of methods for giving the print instruction. One of them is using a "PRINT" menu button 505 for activating the print function that is conventionally and generally provided to the Web browser itself. If the "PRINT" menu button 505 is used, printing is performed using the printer driver installed in the client, in which the Web browser 10 operates, with a layout optimized for the display on the screen.

As another method for giving the print instruction, a method for selecting a print button 508 from the print menu to be displayed on the UI provided by the Web application 20 can be used. The exemplary embodiment of the present invention can realizes the characteristic print processing according to the print instruction using the print button 508. When the user selects the print button 508 to give the print instruction, the Web application 20 causes the print data generation unit 207 to generate the print data 208 with the optimum layout for outputting the print data 208 onto paper.

With reference to FIG. 6B, an example of a display when the print button 508 is pressed will be described.

A management screen 610 for checking print contents includes regions such as [PRINTER LIST], [PRINT RANGE], and [NUMBER OF COPIES]. In the [PRINT RANGE], a page that the user wants to print of the document data to be printed can be easily set, and in the [NUMBER OF COPIES], the number of copies to be printed can be easily set.

In the [PRINTER LIST], using a [PRINTER NAME] list control 611, the printers that can be selected as the output target printer can be displayed and selected. When a [SET DETAILS] button 612 is pressed, a setting screen using the above-described print setting UI display service 1121 is displayed. When a [SEARCH PRINTER] button 613 is pressed, the printer on the network is searched. As a result of the search, the user can select the found printer as the output target printer.

With reference to FIG. 6C, a case when the [SET DETAILS] button 612 is pressed will be described.

The print setting screen 620 illustrates an example of displaying the UI for print setting using the device type information acquired from the above-described various types of print services and the output target printer. More specifically, an output size, a print orientation, page integration, two-sided printing, stamp, and print preview can be set. Based on values set here, the print setting UI display service 1121 creates the print setting data.

Figure 7:
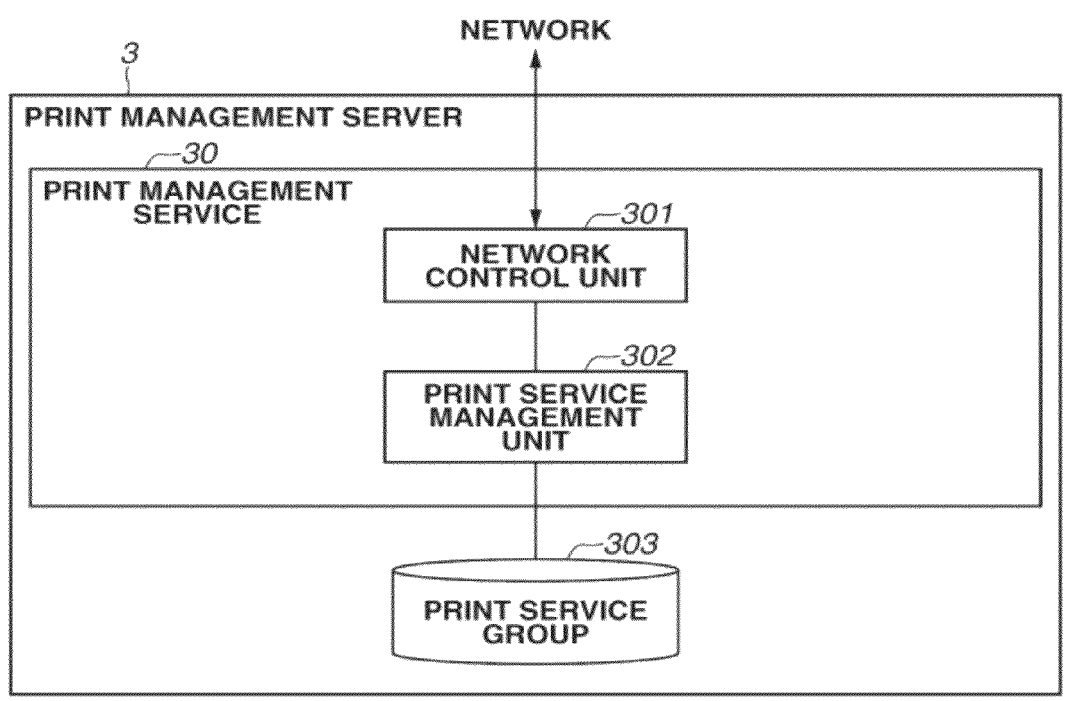
FIG. 7 is an example of an internal configuration of a print management server.

FIG. 7 is a block diagram illustrating an example of internal components of the print management server.

A network control unit 301 controls communication with an external information processing apparatus and the printer 4. A print service management unit 302 processes a request transmitted from the network control unit 301. Further, the print service management unit 302 manages a print service group to be provided for the Web browser 10 using a print service database 303. The print service management unit 302 searches a requested print service from the print service database 303 and performs control for transmitting the requested print service to the request source via the network control unit 301.

FIG. 8 illustrates an example of the print setting data. In the exemplary embodiment of the present invention, a "PrintTicket" described on the XML basis will be explained as an example.

In the illustrated print setting data, setting items, such as the output size (PageMediaSize), the print orientation (PageOrientation), and the page integration (JobCopiesAllDocuments) are set. As to the output size, "Letter" is set. As to the print orientation "Landscape" is set. As to the page integration, "2 pages/sheet ("2")" is set.

In addition to the above described setting items, various items such as settings about stapling or binding, and ecologically friendly setting (e.g., toner saving setting) can be included in the setting items for the print setting data. With reference to the set values of these setting items, the print service control unit 1130 of the print control function 1100 calls up and uses the necessary print service.

FIG. 9 illustrates an example of the device type information about the printer 4.

The illustrated device type information includes information such as "XXXX xxxxx" as a printer name (PrinterName) and "XPS" as a print language that the printer can interpret. In the description illustrated in FIG. 9, as to the print language, a value of "IsPDFSupported" is "false" and a value of "IsXPSSupported" is "true", and thus it can be understood that the supported print language is "XPS".

The print service control unit 1130 of the print control function 1100 checks the format of the print data acquired from the Web application and performs processing for converting the format of the print data into the print language "XPS" that the printer can interpret, for example, using the PDL conversion service 1125 if the format is the PDF.

Figure 10:
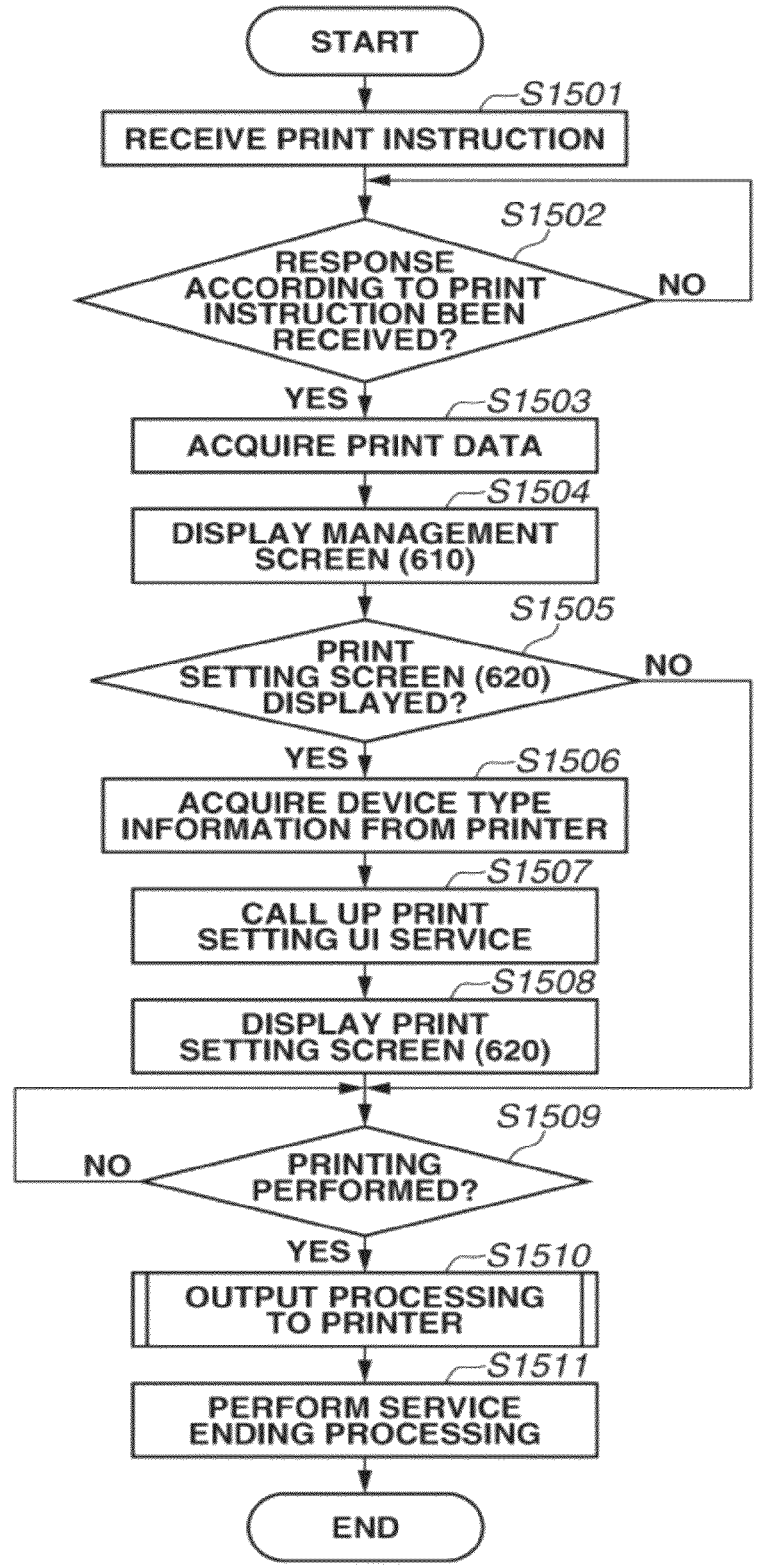
FIG. 10 is a flowchart illustrating processing for issuing a print instruction according to a first exemplary embodiment.

FIG. 10 is a flowchart illustrating processing performed by the client 1 when the print instruction from the user is received on the Web application 20 activated via the Web browser 10.

In step S1501, at a timing when the Web application 20 is activated via the Web browser 10 and starts receiving the printing instruction from the user. The instruction from the user is detected by the input control unit 1004 of the Web browser 10. Then, the detected input is transmitted to the Web application 20 via the network control unit 1001.

In step S1502, the network control unit 1001 waits until receiving a response from the Web application 20 according to the print instruction that has received thereby. When the network control unit 1001 receives the print data 208 as the response from the Web application 20 (YES in step S1502), in step S1503, the network control unit 1001 transmits the received print data 208 to the print control unit 1110.

In step S1504, the print control unit 1110 performs control for displaying the UI (the management screen 610) for allowing the user to input a print execution instruction with respect to the received print data 208. Further, at this point, the printer that can be the output target and is managed by the printer management unit 1120 is called up so that the user can select the output target printer from the [PRINTER NAME] list control 611. The printer called up here, as described above, may be the printer that is previously registered, or the printer searched on the network.

A method for searching the printer with which the printer management unit 1120 can perform output will be described below as a representative example. In the example, the printer management unit 1120 communicates with the printers connected to the network 5, and acquires information such as a name, an installation location, an internet protocol (IP) address, and a hardware identification (ID) of the respective printers. Further, as a communication method, a protocol such as a simple network management protocol (SNMP) can be used.

To check a status of the printer (e.g., whether a power is on) and whether the printer is connected to the network 5, the printer management unit 1120 transmits a predetermined data via the broadcast to attempt the communication with apparatuses on the network. The printer management unit 1120 receives the information about the name and installation location of the printer from the printer 4 via the network I/F as the response. Then, based on the received information, the printer management unit 1120 determines whether the printer can output. By this searching processing, the printer management unit 1120 acquires the information about the printer that can be the output target and manages it.

In step S1505, the print control unit 1110 determines whether the [SET DETAILS] button is pressed from the management screen 610. When it is determined that the [SET DETAILS] button is pressed (YES in step S1505), the processing proceeds to step S1506.

In step S1506, the printer communication unit 1140 communicates with the printer 4 selected by the [PRINTER NAME] list control 611 to acquire the device type information 41. Then, in step S1507, the print service control unit 1130 calls up the print setting UI display service 1121. When the print service control unit 1130 does not previously manage the print setting UI display service 1121, the print service control unit 1130 communicates the print management server to acquire the service.

In step S1508, using the print setting UI display service 1121, the print control unit 1110 creates and displays the print setting screen 620 corresponding to the device type information acquired in step S1506.

Figure 11:
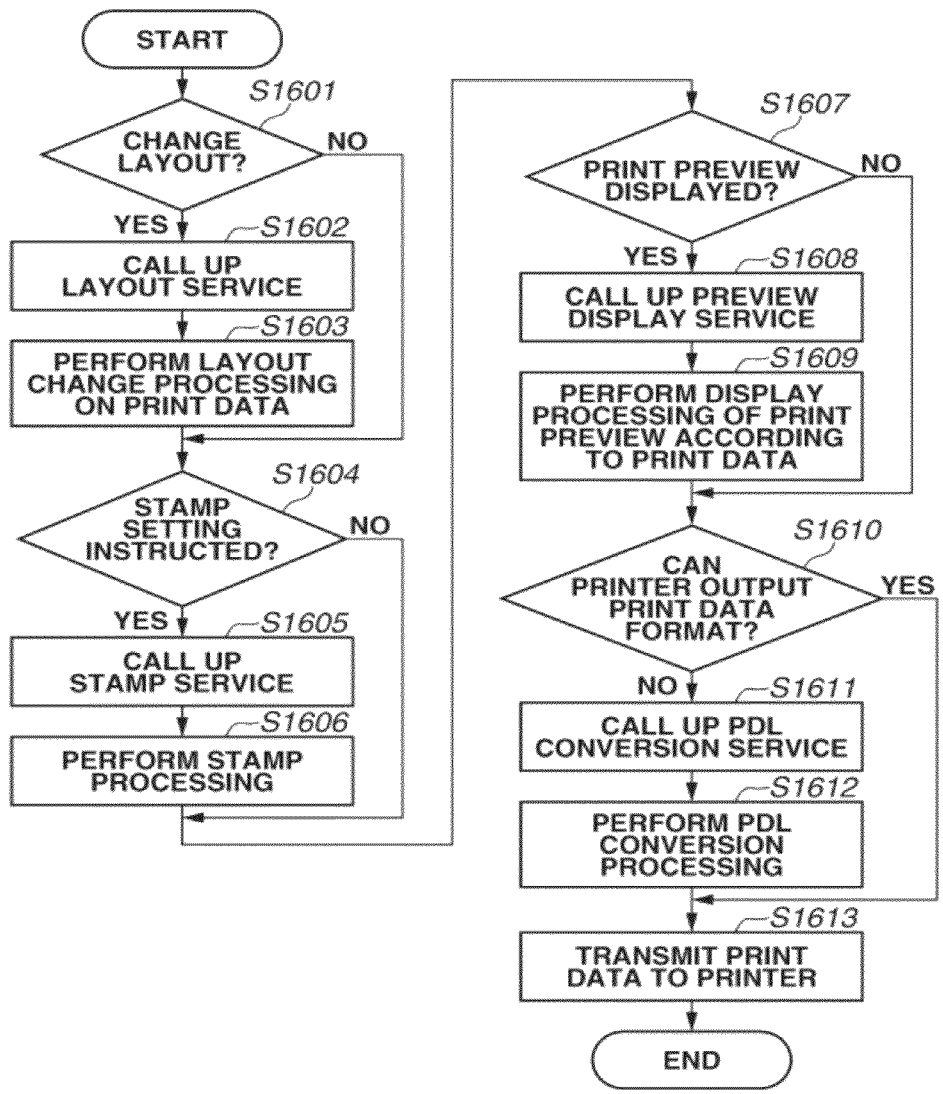
FIG. 11 is a flowchart illustrating processing for transmitting print data to a printer according to the first exemplary embodiment.

In step S1509, the print control unit 1110 waits until receiving the print execution instruction. When the print control unit 1110 receives the print execution instruction via the management screen 610 or the print setting screen 620 (YES in step S1509), the processing proceeds to step S1510. In step S1510, as illustrated in FIG. 11, processing for causing the printer to execute desired print output is performed.

In step S1511, the print control unit 1110 instructs the print service control unit 1130 to end the service. At this point, the print service control unit 1130 may delete the managed print service and acquire the print service by communicating with the print management server every time the print instruction is received from the user. According to the processing described above, a series of print processing using the Web application 20 ends.

As the print control function 1100 included in the Web browser 10, for example, a case where the Web browser 10 has a simple configuration, which does not include a function for acquiring the device type information from the printer and a function for acquiring the service program from the print management server 3, will be described.

In this case, since the processing of steps S1506 and S1507 are not performed, the display is controlled so that the [SET DETAILS] button is not included or the [SET DETAILS] button cannot be pressed in the screen (610) displayed in step S1504. Accordingly, after the processing in step S1504, upon receiving the print execution instruction from the user in step S1509, the print processing directly proceeds. Even in this case, the user can check the output printer and the number of copies to be printed, and the simple printing can be performed.

FIG. 11 is a flowchart illustrating the details of processing in step S1510 illustrated in FIG. 10. As will be described in steps S1601, S1604, S1607, and S1610, the print control unit 1110 determines whether to need the processing using the print service for the print data with reference to the print setting data. When any print service is necessary, the print control unit 1110 instructs the print service control unit 1130 to perform various types of processing on the print data using the print service.

First, in step S1601, the print control unit 1110 determines whether layout change is instructed. For example, when the set value of [PAGE INTEGRATION] is set to n-up (n>1), it is determined that the layout is to be changed. When the print control unit 1110 determines that the layout change is instructed (YES in step S1601), the processing proceeds to step S1602. When the print control unit 1110 determines that the layout change is not instructed (NO in step S1601), the step proceeds to step S1604.

In step S1602, the print service control unit 1130 calls up the layout service 1122. As described above, such a print service may be acquired by communicating with the print management server as necessary. In step S1603, the print service control unit 1130 activates the layout service 1122 to edit the layout set for the print data.

In step S1604, the print control unit 1110 determines whether the stamp setting is instructed. For example, the set value of the [STAMP] is set to ON, it is determined that setting to add the stamp image is instructed. When the print control unit 1110 determines that the stamp setting is instructed (YES in step S1604), the processing proceeds to step S1605. When the print control unit 1110 determines that the stamp setting is not instructed (NO in step S1604), the processing proceeds to step S1607.

In step S1605, the print service control unit 1130 calls up the stamp service 1123. In step S1606, the print service control unit 1130 activates the stamp service 1123 to perform processing for adding the set stamp image to the print data.

In step S1607, the print control unit 1110 determines whether the display of the print preview is instructed. For example, when the set value of the [PRINT PREVIEW] is set to ON, it is determined that the display of the print preview is instructed. When the print control unit 1110 determines that the display of the print preview is instructed (YES in step S1607), the processing proceeds to step S1608. When the print control unit 1110 determines that the display of the print preview is not instructed (NO in step S1607), the processing proceeds to step S1610.

In S1608, the print service control unit 1130 calls up the preview display service 1124. In step S1609, the print service control unit 1130 activates the preview display service 1124 to control the display of the print preview corresponding to the print data reflecting the settings so far. The preview is displayed via the Web browser 10.

When print execution is instructed in the preview (when the OK button is pressed), the processing proceeds to step S1610. When cancelling is instructed, the print data is not transmitted but the processing in step S1511 is performed to end a series of the processing.

In step S1610, the print control unit 1110 determines whether the printer 4 selected as the output target printer can output the data format of the print data 208 acquired by the Web application 20. If the printer 4 can output the format (YES in step S1610), the processing proceeds to step S1613. If the printer 4 cannot output the format (NO in step S1610), the processing proceeds to step S1611.

In step S1611, the print service control unit 1130 calls up the PDL conversion service 1125. In step S1612, the print service control unit 1130 activates the PDL conversion service 1125 to perform PDL conversion processing on the print data. For example, when the Web browser 10 receives the print data in the PDF format, the PDF format is converted into a print language (e.g., XPS) supported by the printer 4.

In step S1613, the print control unit 1110 transmits to the printer 4 the print data created by the processing so far. The printer 4 processes the received print data based on the set print setting to perform print output.

According to the present exemplary embodiment, when printing is performed from the general Web application 20 that can create versatile data (e.g., in the PDF format), printing can be directly performed from the Web browser 10 without installing the printer driver in the client.

In a second exemplary embodiment, processing for monitoring an output status and re-printing after a print job is transmitted to the printer 4 in the first exemplary embodiment will be described. More specifically, after the print data is transmitted, the Web browser 10 communicates with the printer 4 and monitors print output to be normally completed, and then performs the processing for ending the service described in step S1511.

Figure 12:
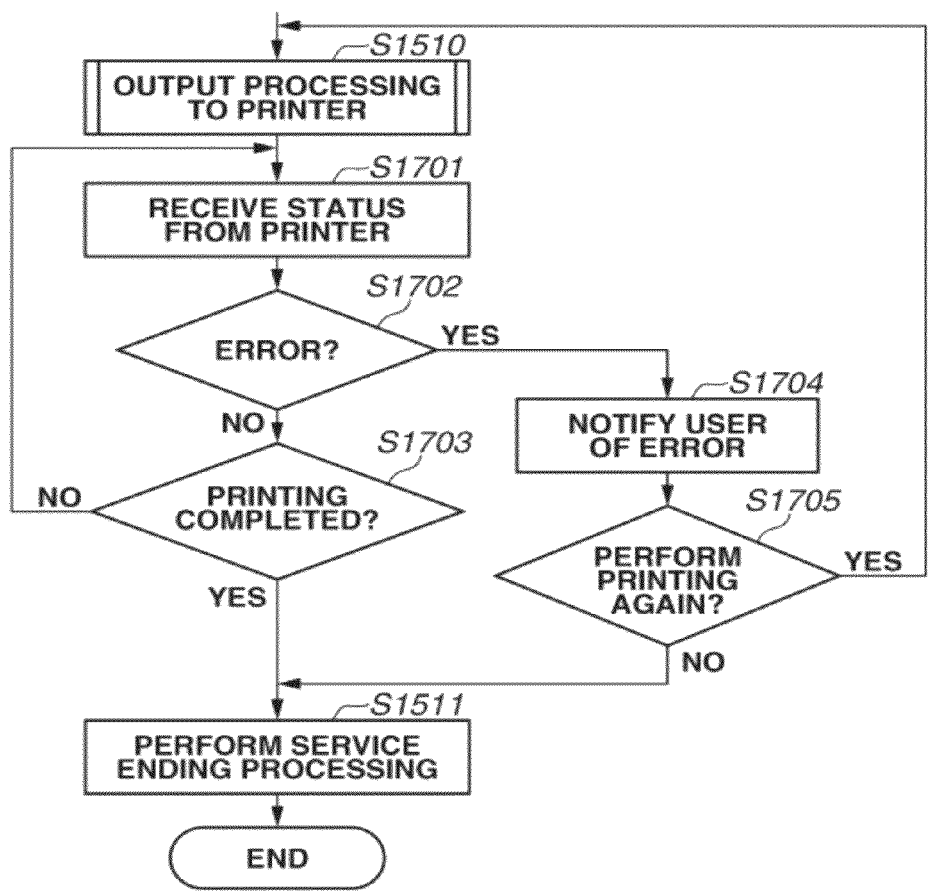
FIG. 12 is a flowchart illustrating processing for monitoring print output according to a second exemplary embodiment.

FIG. 12 is a flowchart illustrating processing for monitoring print output by the printer performed between the processing in steps S1510 and S1511 described with reference to FIG. 10.

In step S1701, the printer communication unit 1140 receives the status from the printer 4 that has transmitted the print data. The processing for receiving the status can be performed by, for example, a method in which the printer communication unit 1140 requests the printer to transmit its status at every predetermined timing or a method in which the printer communication unit 1140 receives the status, such as a completion or an error of print output, voluntarily transmitted from the printer.

In step S1702, the print control unit 1110 determines whether the status of the printer 4 received via the printer communication unit 1140 is an error. When the status is not the error (NO in step S1702), the processing proceeds to step S1703. If the status is the error (YES in step S1702), the processing proceeds to step S1704.

In step S1703, the print control unit 1110 determines whether the status of the printer 4 received via the printer communication unit 1140 is the completion of the print output. When the status is the completion of the print output (YES in S1703), the processing proceeds to step S1511. If the status is other than the completion of the print output, e.g., a notification of printing progress (NO in step S1703), the processing returns to step S1701 and waits for the next status reception.

In step S1704, the print control unit 1110 displays a display screen (not illustrated) for notifying the user of an occurrence of the error on the Web browser 10 as an error notification. Further, the display screen for the error notification includes an inquiry to the user about whether to perform re-printing with the same setting.

In step S1705, the print control unit 1110 determines whether the print control unit 1110 has received an input for performing re-printing from the user. When the print control unit 1110 receives the input for re-printing (YES in step S1705), the processing returns to step S1510, and the print data is transmitted to the printer again. When the print control unit 1110 receives the input for not re-printing (NO in step S1705), the processing proceeds to step S1511.

In the exemplary embodiments described above, basically, the print processing which is performed by the Web browser 10 without installing the printer driver in the client is described. In some cases, however, the printer driver commonly used by users may be already installed in the client. A third exemplary embodiment is characterized in that when the management screen 610 is displayed, the already installed printer driver is taken into consideration.

More specifically, when the printer that can be the output target and is managed by the printer management unit 1120 is called up, information about the printer driver already installed in the client is acquired from the OS at the same time. When the information about the printer driver can be acquired, the corresponding printer is displayed on the [PRINTER NAME] list control 611. Displaying the printer in which the printer driver has been already installed may be controlled so that the user can easily identify the printer, for example, the printer is displayed on the top of the list. Further, when the [SET DETAILS] button 612 is pressed, the print setting screen provided by the printer driver may be opened.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2010-104297 filed Apr. 28, 2010, which is hereby incorporated by reference herein in its entirety.

The invention claimed is:

1. A print system that includes an information processing apparatus including a Web browser and an application server including an application used via the Web browser, wherein the application server comprises:

a generation unit configured to generate print data to be transmitted to the information processing apparatus using the application according to a print instruction via the Web browser; and wherein the information processing apparatus comprises:
a registration unit configured, as a function of the Web browser, to register information related to a printer to a predetermined storage region in the information processing apparatus based on a precedent instruction by a user;
a control unit configured, as a function of the Web browser, to control a display of a screen for receiving a selection of an execution instruction to print the generated print data received from the application server, wherein the screen is displayed according to the registered information by the registration unit if a menu button included in a web page provided by the application of the application server is selected; and
a transmission unit configured, as a function of the Web browser, to transmit the print data received from the application server to the printer related to the registered information corresponding to the selection received via the screen displayed by the control unit, through the network.

2. A method for controlling a print system that includes an information processing apparatus including a Web browser and an application server including an application used via the Web browser, wherein the application server comprises:
generating print data to be transmitted to the information processing apparatus using the application according to a print instruction via the Web browser, and
wherein the information processing apparatus comprises:
as a function of the Web browser, registering information related to a printer to a predetermined storage region in the information processing apparatus based on a precedent instruction by a user;
controlling, as a function of the Web browser, a display of a screen for receiving a selection of an execution instruction to print the generated print data received from the application server, wherein the screen is displayed according to the registered information if a menu button included in a web page provided by the application of the application server is selected; and
transmitting, as a function of the Web browser, the print data received from the application server to the printer related to the registered information corresponding to the selection received via the screen displayed, through the network.

3. An information processing apparatus that includes a Web browser using an application of an application server connected thereto via a network, the information processing apparatus comprising:
a registration unit configured to, as a function of the Web browser, register information related to an output device to a predetermined storage region in the information processing apparatus based on a precedent instruction by a user;
a control unit configured to, as a function of the Web browser, control a display of a screen for receiving a selection of an execution instruction to output of data received from the application server, wherein the screen is displayed according to the registered information by the registration unit if a menu button included in a web page provided by the application of the application server is selected; and
a transmission unit configured to, as a function of the Web browser, transmit the data received from the application server to the output device related to the registered information corresponding to the selection received via the screen displayed by the control unit, through the network.

4. The information processing apparatus according to claim 3, wherein the transmission unit is further configured to transmit, through the network, the data to another output device that is found as a result of search on the network.

5. The information processing apparatus according to claim 3, further comprising, as a function of the Web browser, a communication unit configured to acquire information including data type information supported by the output device.

6. The information processing apparatus according to claim 5, wherein the communication unit receives a status of output from the output device to which the transmission unit has transmitted the data.

7. The information processing apparatus according to claim 3, further comprising, as a function of the Web browser, a service control unit configured to call up a service to be applied to the data received from the application server.

8. The information processing apparatus according to claim 7, wherein the service control unit acquires the service from another server connected via the network.

9. The information processing apparatus according to claim 7, wherein, if an input for setting an output format of the data is received via the screen displayed by the control unit, the service control unit calls up an output setting user interface (UI) display service to control a display of an output setting screen.

10. The information processing apparatus according to claim 9, wherein the output setting screen is a screen through which a setting corresponding to the output device can be made.

11. The information processing apparatus according to claim 7, wherein the service control unit calls up a service corresponding to a setting set for the data to perform processing corresponding to the setting.

12. The information processing apparatus according to claim 11, wherein the setting includes at least either of page integration and a stamp.

13. The information processing apparatus according to claim 7, wherein, if a format of the data received from the application server is not supported by the output device, the service control unit calls up a service for converting a format to perform processing for converting the format of the data into a format supported by the output device.

14. The information processing apparatus according to claim 3, wherein a format of the print data received from the application server is a portable document format (PDF).

15. A method provided as a function of a Web browser that uses an application of an application server connected via a network, the method comprising:
as a function of the Web browser, registering information related to an output device to a predetermined storage region in an information processing apparatus based on a precedent instruction by a user;
controlling a display of a screen for receiving a selection of an execution instruction to output of data received from the application server, wherein the screen is displayed according to the registered information if a menu button included in a web page provided by the application of the application server is selected; and
transmitting the data received from the application server to the output device related to the registered information corresponding to the selection received via the screen displayed by the control, through the network.

16. A non-transitory computer-readable storage medium in which a program is recorded for realizing a method provided as a function of a Web browser that uses an application of an application server connected via a network, the method comprising:

as a function of the Web browser, registering information related to an output device to a predetermined storage region in an information processing apparatus based on a precedent instruction by a user;

controlling a display of a screen for receiving a selection of an execution instruction to output of data received from the application server, wherein the screen is displayed according to the registered information if a menu button included in a web page provided by the application of the application server is selected; and transmitting the data received from the application server to the output device related to the registered information corresponding to the selection received via the screen displayed by the control, through the network.

17. The information processing apparatus according to claim 3, wherein the registration unit, the generation unit and the transmission unit are functions added to the Web browser as a plug-in program.

18. The print system according to claim 1, wherein a transmission of the print data by the transmission unit is not used in a printer driver program.

19. The information processing apparatus according to claim 3, wherein a transmission of the data by the transmission unit is not used in a device driver program compatible with the output device.

20. The method according to claim 15, the transmission is further configured to transmit, through the network, the data that is found as a result of search by being search on the network.

21. The method according to claim 15, further comprising, as a function of the Web browser, acquiring information including data type information supported by the output device.

22. The method according to claim 21, further comprising receiving a status of output from the output device to which the transmission has transmitted the data.

23. The method according to claim 15, further comprising, as a function of the Web browser, calling up a service to be applied to the data received from the application server.

24. The method according to claim 23, wherein acquiring the service from another server connected via the network.

25. The method according to claim 23, wherein, if an input for setting an output format of the data is received via the screen displayed, calling up an output setting user interface (UI) display service to control a display of an output setting screen.

26. The method according to claim 25, wherein the output setting screen is a screen through which a setting corresponding to the output device can be made.

27. The method according to claim 23, wherein calling up a service corresponding to a setting set for the data to perform processing corresponding to the setting.

28. The method according to claim 27, wherein the setting includes at least either of page integration and a stamp.

29. The method according to claim 23, wherein, if a format of the data received from the application server is not supported by the output device, calling up a service for converting a format to perform processing for converting the format of the data into a format supported by the output device.

30. The method according to claim 15, wherein a format of the print data received from the application server is a portable document format (PDF).

31. The method according to claim 15, wherein the registering, the generating and the transmitting are functions added to the Web browser as a plug-in program.

* * * * *